(12) United States Patent
de la Broise

(10) Patent No.: US 8,989,133 B2
(45) Date of Patent: Mar. 24, 2015

(54) SYSTEM AND METHOD FOR REDUCING INTERFERENCE BETWEEN COMMUNICATIONS OF COEXISTING TRANSCEIVERS

(71) Applicant: Marvell World Trade Ltd., St. Michael (BB)

(72) Inventor: Josselin de la Broise, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/336,167

(22) Filed: Jul. 21, 2014

(65) Prior Publication Data

US 2014/0328290 A1 Nov. 6, 2014

Related U.S. Application Data

(63) Continuation of application No. 13/587,390, filed on Aug. 16, 2012, now Pat. No. 8,787,293.

(60) Provisional application No. 61/530,220, filed on Sep. 1, 2011.

(51) Int. Cl.
| | | |
|---|---|---|
| H04W 4/00 | (2009.01) | |
| H04J 3/00 | (2006.01) | |
| H04W 72/08 | (2009.01) | |
| H04W 72/04 | (2009.01) | |
| H04W 72/12 | (2009.01) | |

(52) U.S. Cl.
CPC ........ *H04W 72/082* (2013.01); *H04W 72/0446* (2013.01); *H04W 72/0406* (2013.01); *H04W 72/1215* (2013.01)
USPC ............ 370/329; 370/336; 370/338; 370/341

(58) Field of Classification Search
None
See application file for complete search history.

(56) References Cited

U.S. PATENT DOCUMENTS

| | | | |
|---|---|---|---|
| 2010/0062746 A1 | 3/2010 | Proctor, Jr. et al. | |
| 2010/0273417 A1 | 10/2010 | Tian et al. | |
| 2010/0322287 A1* | 12/2010 | Truong et al. | 375/133 |
| 2011/0310869 A1 | 12/2011 | Xhafa et al. | |
| 2012/0164947 A1 | 6/2012 | Kammer et al. | |
| 2012/0190325 A1 | 7/2012 | Abu-Hakima et al. | |
| 2012/0213116 A1* | 8/2012 | Koo et al. | 370/253 |
| 2012/0314598 A1* | 12/2012 | Sadek et al. | 370/252 |
| 2013/0016635 A1 | 1/2013 | Linsky et al. | |
| 2013/0070653 A1* | 3/2013 | Banister et al. | 370/281 |
| 2014/0235175 A1* | 8/2014 | Fu et al. | 455/63.1 |

OTHER PUBLICATIONS

U.S. Appl. No 12/725,924, filed Mar. 17, 2010, Wheeler.

* cited by examiner

*Primary Examiner* — Chi H Pham
*Assistant Examiner* — Soon-Dong D Hyun

(57) ABSTRACT

A wireless device including a first transceiver to communicate according to a first schedule using a first communication protocol. The first schedule includes information of uplink and downlink slots. A second transceiver communicates according to a second schedule using a second communication protocol. The second schedule includes a first number of slots for transmitting packets. A scheduler changes, based on the first schedule, the first number of slots to a second number of slots. The second number of slots is greater than the first number of slots. A packetizer selects a packet type of a first packet for transmission from the first transceiver to a remote device. The packet type indicates that the first packet requires the second number of slots for transmission and shifts transmission of a response from the remote device to one of the downlink slots to minimize interference between communications of the first and second transceivers.

15 Claims, 8 Drawing Sheets

SYSTEM AND METHOD FOR REDUCING INTERFERENCE BETWEEN COMMUNICATIONS OF COEXISTING TRANSCEIVERS

CROSS-REFERENCE TO RELATED APPLICATIONS

This disclosure is a continuation U.S. patent application Ser. No. 13/587,390 (now U.S. Pat. No. 8,787,293), filed Aug. 16, 2012 which claims the benefit of Provisional Patent Application Ser. No. 61/530,220, filed Sep. 1, 2011, entitled "ACL Packets Size Spoofing for Coexistence TDM solutions," the disclosure thereof incorporated by reference herein in its entirety.

FIELD

The present disclosure relates generally to the field of wireless communication. More particularly, the present disclosure relates to avoiding interference between different wireless communication technologies that use adjacent or overlapping frequency bands.

BACKGROUND

The popularity of multiple wireless communication technologies for handheld platforms has created a need to integrate wireless communication technologies on a single wireless communication device. However, frequency bands of some of these technologies are close enough to result in interference. For example, an un-licensed 2.4 GHz Industrial, Scientific and Medical (ISM) frequency band is adjacent to some of the bands used by Mobile Wireless Standards (MWS) technologies to result in adjacent channel interference. In many electronic devices such as smartphones, both ISM and MWS technologies are implemented in a same device. For example, a smartphone may employ LTE (Long Term Evolution) for transmitting and receiving data, and Bluetooth for headsets. LTE transmissions from the smartphone will cause adjacent channel interference with incoming Bluetooth signals. Similarly, Bluetooth from the smartphone will cause adjacent channel interference with incoming LTE signals. This adjacent channel interference can significantly degrade performance not only at the smartphone, but also at connected MWS base stations.

SUMMARY

In general, in one aspect, an embodiment features an apparatus comprising: a Long Term Evolution (LTE) transceiver configured to transmit and receive wireless LTE signals according to an LTE schedule, and to provide LTE schedule information that represents the LTE schedule; and a Bluetooth transceiver configured to transmit and receive wireless Bluetooth signals according to a Bluetooth schedule having a plurality of Bluetooth schedule slots, wherein the wireless Bluetooth signals represent Bluetooth Asynchronous Connection-oriented [logical transport] (ACL) packets; a Bluetooth packetizer configured to generate a Bluetooth ACL packet; and a Bluetooth scheduler configured to select a spoofed number M of the Bluetooth schedule slots for the Bluetooth ACL packet based on the LTE schedule information, wherein M is a positive integer; wherein the Bluetooth packetizer is further configured to select a Bluetooth ACL packet type based on the spoofed number M of the Bluetooth schedule slots, and to indicate the selected Bluetooth ACL packet type in a type field of the Bluetooth ACL packet, prior to the Bluetooth transceiver transmitting the wireless Bluetooth signals representing the Bluetooth ACL packet.

Embodiments of the apparatus can include one or more of the following features. In some embodiments, the Bluetooth ACL packet generated by the Bluetooth packetizer requires only N of the Bluetooth schedule slots, wherein N is a positive integer, and wherein M>N; and the Bluetooth scheduler is further configured to determine the spoofed number M of the Bluetooth schedule slots for the Bluetooth ACL packet based on the LTE schedule information and the integer N. In some embodiments, the LTE schedule includes uplink time slots and downlink time slots, wherein the LTE transceiver is allowed to transmit the wireless LTE signals only during the uplink time slots; the Bluetooth schedule slots include transmit time slots and receive time slots, wherein the Bluetooth transceiver is allowed to begin transmitting each of the wireless Bluetooth signals only during one of the transmit time slots; and the Bluetooth scheduler is further configured to determine the spoofed number M of the Bluetooth schedule slots for the Bluetooth ACL packet so that a corresponding reply Bluetooth ACL packet is received during one of the downlink time slots. In some embodiments, the LTE schedule information represents a duration of the uplink time slots, a duration of the downlink time slots, and a frame synchronization indicator. In some embodiments, M=3 or 5. In some embodiments, the Bluetooth scheduler is further configured to determine a time for transmitting the wireless Bluetooth signals representing the Bluetooth ACL packet based on an alignment between the time slots of the LTE schedule and the time slots of the Bluetooth schedule. Some embodiments comprise one or more integrated circuits comprising the apparatus. Some embodiments comprise an electronic device comprising the apparatus.

In general, in one aspect, an embodiment features a method for an electronic device, the method comprising: transmitting and receiving wireless Long Term Evolution (LTE) signals according to an LTE schedule; transmitting and receiving wireless Bluetooth signals according to a Bluetooth schedule having a plurality of Bluetooth schedule slots, wherein the wireless Bluetooth signals represent Bluetooth Asynchronous Connection-oriented [logical transport] (ACL) packets; generating a Bluetooth ACL packet; selecting a spoofed number M of the Bluetooth schedule slots for the Bluetooth ACL packet based on information representing the LTE schedule, wherein M is a positive integer; selecting a Bluetooth ACL packet type based on the spoofed number M of the Bluetooth schedule slots; and indicating the selected Bluetooth ACL packet type in a type field of the Bluetooth ACL packet prior to transmitting the wireless Bluetooth signals representing the Bluetooth ACL packet.

Embodiments of the method can include one or more of the following features. In some embodiments, wherein the Bluetooth ACL packet requires only N of the Bluetooth schedule slots, wherein N is a positive integer, the method further comprises: determining the spoofed number M of the Bluetooth schedule slots for the Bluetooth ACL packet based on the LTE schedule information and the integer N, wherein M>N. In some embodiments, the LTE schedule includes uplink time slots and downlink time slots, wherein the electronic device is allowed to transmit the wireless LTE signals only during the uplink time slots; the Bluetooth schedule slots include transmit time slots and receive time slots, wherein the electronic device is allowed to begin transmitting each of the wireless Bluetooth signals only during one of the transmit time slots; and the method further comprises determining the spoofed number M of the Bluetooth schedule slots for the Bluetooth ACL packet so that a corresponding reply Bluetooth ACL packet is received during one of the downlink time slots. In some embodiments, the LTE schedule information represents a duration of the uplink time slots, a duration of the downlink time slots, and a frame synchronization indicator. In some embodiments, M=3 or 5. Some embodiments comprise determining a time for transmitting the wireless Bluetooth signals representing the Bluetooth ACL packet based on an alignment between the time slots of the LTE schedule and the time slots of the Bluetooth schedule.

In general, in one aspect, an embodiment features computer-readable media embodying instructions executable by a computer in an electronic device to perform functions comprising: transmitting and receiving wireless Long Term Evolution (LTE) signals according to an LTE schedule; transmitting and receiving wireless Bluetooth signals according to a Bluetooth schedule having a plurality of Bluetooth schedule slots, wherein the wireless Bluetooth signals represent Bluetooth Asynchronous Connection-oriented [logical transport] (ACL) packets; generating a Bluetooth ACL packet; selecting a spoofed number M of Bluetooth schedule slots for the Bluetooth ACL packet based on information representing the LTE schedule, wherein M is a positive integer; selecting a Bluetooth ACL packet type based on the spoofed number M of the Bluetooth schedule slots; and indicating the selected Bluetooth ACL packet type in a type field of the Bluetooth ACL packet prior to transmitting the wireless Bluetooth signals representing the Bluetooth ACL packet.

Embodiments of the computer-readable media can include one or more of the following features. In some embodiments, the Bluetooth ACL packet requires only N of the Bluetooth schedule slots, wherein N is a positive integer, and wherein the functions further comprise: determining the spoofed number M of the Bluetooth schedule slots for the Bluetooth ACL packet based on the LTE schedule information and the integer N, wherein M>N. In some embodiments, the LTE schedule includes uplink time slots and downlink time slots, wherein the electronic device is allowed to transmit the wireless LTE signals only during the uplink time slots; the Bluetooth schedule slots include transmit time slots and receive time slots, wherein the electronic device is allowed to begin transmitting each of the wireless Bluetooth signals only during one of the transmit time slots; and wherein the functions further comprise determining the spoofed number M of the Bluetooth schedule slots for the Bluetooth ACL packet so that a corresponding reply Bluetooth ACL packet is received during one of the downlink time slots. In some embodiments, the LTE schedule information represents a duration of the uplink time slots, a duration of the downlink time slots, and a frame synchronization indicator. In some embodiments, M=3 or 5. In some embodiments, the functions further comprise: determining a time for transmitting the wireless Bluetooth signals representing the Bluetooth ACL packet based on an alignment between the time slots of the LTE schedule and the time slots of the Bluetooth schedule.

The details of one or more implementations are set forth in the accompanying drawings and the description below. Other features will be apparent from the description and drawings, and from the claims.

Figure 1:
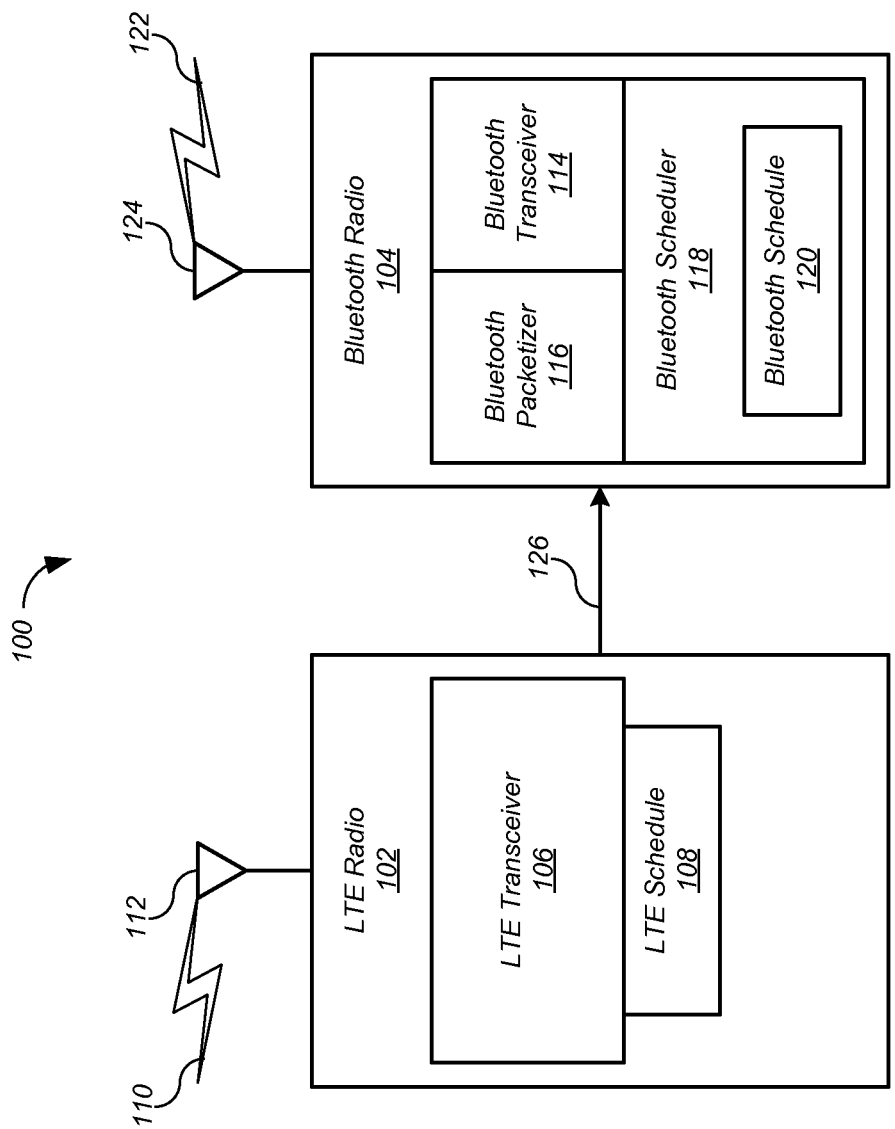
FIG. 1 shows elements of a user equipment according to one embodiment.

The leading digit(s) of each reference numeral used in this specification indicates the number of the drawing in which the reference numeral first appears.

DETAILED DESCRIPTION

Embodiments of the present disclosure provide coexistence in an electronic device, also referred to herein as "user equipment," having both a Long Term Evolution (LTE) radio and a Bluetooth radio. According to the described embodiments, the Bluetooth radio modifies (that is, "spoofs") a packet type of a transmitted Bluetooth Asynchronous Connection-oriented [logical transport] (ACL) packet. Because the packet type indicates a number of Bluetooth schedule slots required to transmit the packet, spoofing the packet type can be used to shift an arrival time of a corresponding reply packet to a time when the arriving packet will not interfere with reception of LTE signals by the co-located LTE radio. While described in terms of an LTE radio, the disclosed embodiments apply to other Mobile Wireless Standards (MWS) radios such as Worldwide Interoperability for Microwave Access (WiMAX) and the like.

FIG. 1 shows elements of a user equipment 100 according to one embodiment. Although in the described embodiments, elements of the user equipment 100 are presented in one arrangement, other embodiments may feature other arrangements. For example, elements of the user equipment 100 can be implemented in hardware, software, or combinations thereof. The user equipment 100 can be implemented as any sort of electronic device capable of performing functions described herein. For example, the user equipment 100 can be implemented as a smartphone, tablet computer, or the like. Elements of user equipment 100 can be implemented as one or more integrated circuits.

Referring to FIG. 1, the user equipment 100 includes an LTE radio 102 and a Bluetooth radio 104. The LTE radio 102 includes an LTE transceiver 106, and stores an LTE schedule 108. The LTE transceiver 106 transceives (that is, transmits and receives) wireless LTE signals 110 according to the LTE schedule 108 using one or more antennas 112. The Bluetooth radio 104 includes a Bluetooth transceiver 114, a Bluetooth packetizer 116, and a Bluetooth scheduler 118. The Bluetooth scheduler 118 stores a Bluetooth schedule 120. The Bluetooth transceiver 114 transceives wireless Bluetooth signals 122 according to the Bluetooth schedule 120 using one or more antennas 124. In some embodiments, one or more of the antennas 112, 124 can be combined. The Bluetooth scheduler 118 can be implemented as a processor. The LTE radio 102 and the Bluetooth radio 104 can be implemented as one or more integrated circuits. The LTE radio 102 provides LTE schedule information 126 to the Bluetooth radio 104.

Figure 2:
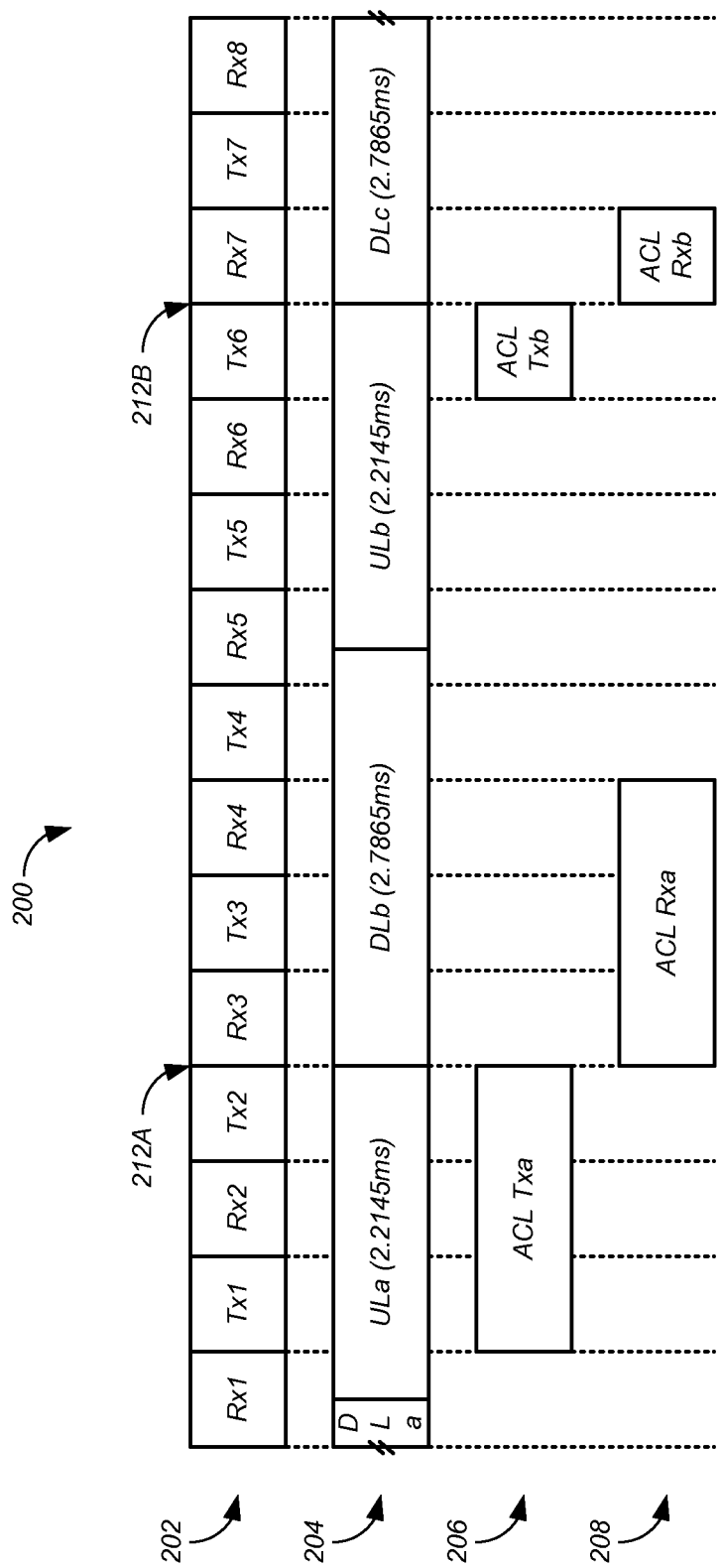
FIG. 2 shows a timeline for conventional Bluetooth and LTE schedules with frame alignment.

In some cases, it is easy for the Bluetooth scheduler 118 to find time for Bluetooth ACL transmission, for example when there is frame alignment between the LTE schedule and the Bluetooth schedule. FIG. 2 shows a timeline 200 for conventional Bluetooth and LTE schedules with frame alignment. Referring to FIG. 2, the Bluetooth schedule is shown at 202, and consists of alternating receive time slots Rx and transmit time slots Tx. The Bluetooth transceiver 114 is allowed to begin transmitting the wireless Bluetooth signals 122 only during a transmit time slot Tx. All receive time slots Rx and transmit time slots Tx have the same duration 625 us. The LTE schedule is shown at 204, and consists of alternating downlink time slots (DL) and uplink time slots (UL). The LTE transceiver 106 is allowed to transmit the wireless LTE signals 110 only during the uplink time slots UL. In the example of FIG. 2, a duration of each LTE downlink time slot DL is 2.7865 ms, and a duration of each LTE uplink time slot UL is 2.2145 ms.

Frame alignments between the Bluetooth schedule 202 and the LTE schedule 204 are indicated at 212A and 212B. Frame alignments 212 occur where a boundary between a Bluetooth transmit time slot Tx and a following Bluetooth receive time slot Rx occurs at the same time as a boundary between an LTE uplink time slot UL and a following LTE downlink time slot DL. In the example of FIG. 2, frame alignment 212A occurs at a boundary between Bluetooth time slots Tx2 and Rx3 and a boundary between LTE time slots ULa and DLb. Frame alignment 212B occurs at a boundary between Bluetooth time slots Tx6 and Rx7 and a boundary between LTE time slots ULb and DLc. Frame alignments can also occur where the boundary between a Bluetooth receive time slot Rx and the following Bluetooth transmit time slot Tx occurs at the same time as a boundary between an LTE downlink time slot DL and a following LTE uplink time slot UL. Frame alignment can sometimes be obtained by adjusting a phase of a Bluetooth clock in accordance with the LTE schedule 108.

In the described embodiments, the Bluetooth transceiver 114 acts as a Bluetooth master device. In FIG. 2, the Bluetooth ACL packets (ACL Tx) transmitted by the Bluetooth transceiver 114 to a Bluetooth slave device are shown at 206, and the Bluetooth ACL packets (ACL Rx) received by the Bluetooth transceiver 114 from a Bluetooth slave device are shown at 208. A Bluetooth ACL packet can occupy 1, 3, or 5 Bluetooth time slots. A Bluetooth ACL packet that occupies 3 or 5 Bluetooth time slots is referred to as a "multi-slot" packet. Packets sent by the Bluetooth master must begin in a transmit time slot Tx. Packets sent by the Bluetooth slave must begin in a receive time slot Rx. A Bluetooth slave device sends Bluetooth packets only in response to a Bluetooth packet transmitted by the master device, and starting only in the time slot following the received packet.

In the example of FIG. 2, these conditions are easy to satisfy thanks to the frame alignments 212. The Bluetooth scheduler 118 can simply schedule a packet to be transmitted so transmission of the packet ends at the frame alignment 212. Then the reply packet is sent by the Bluetooth slave right after the frame alignment 212. For example, in FIG. 2, the Bluetooth transceiver 114 transmits a three-slot packet ACL Txa right before the frame alignment 212A, thereby causing the Bluetooth slave to transmit a reply packet ACL Rxa right after the frame alignment 212A. Similarly, the Bluetooth transceiver 114 transmits a one-slot packet ACL Txb right before the frame alignment 212B, thereby causing the Bluetooth slave to transmit a reply packet ACL Rxb right after the frame alignment 212B. In both cases, the Bluetooth packet transmissions are aligned with the LTE uplink time slots UL, and the Bluetooth packet receptions are aligned with the LTE downlink time slots DL, resulting in minimal mutual interference.

Figure 3:
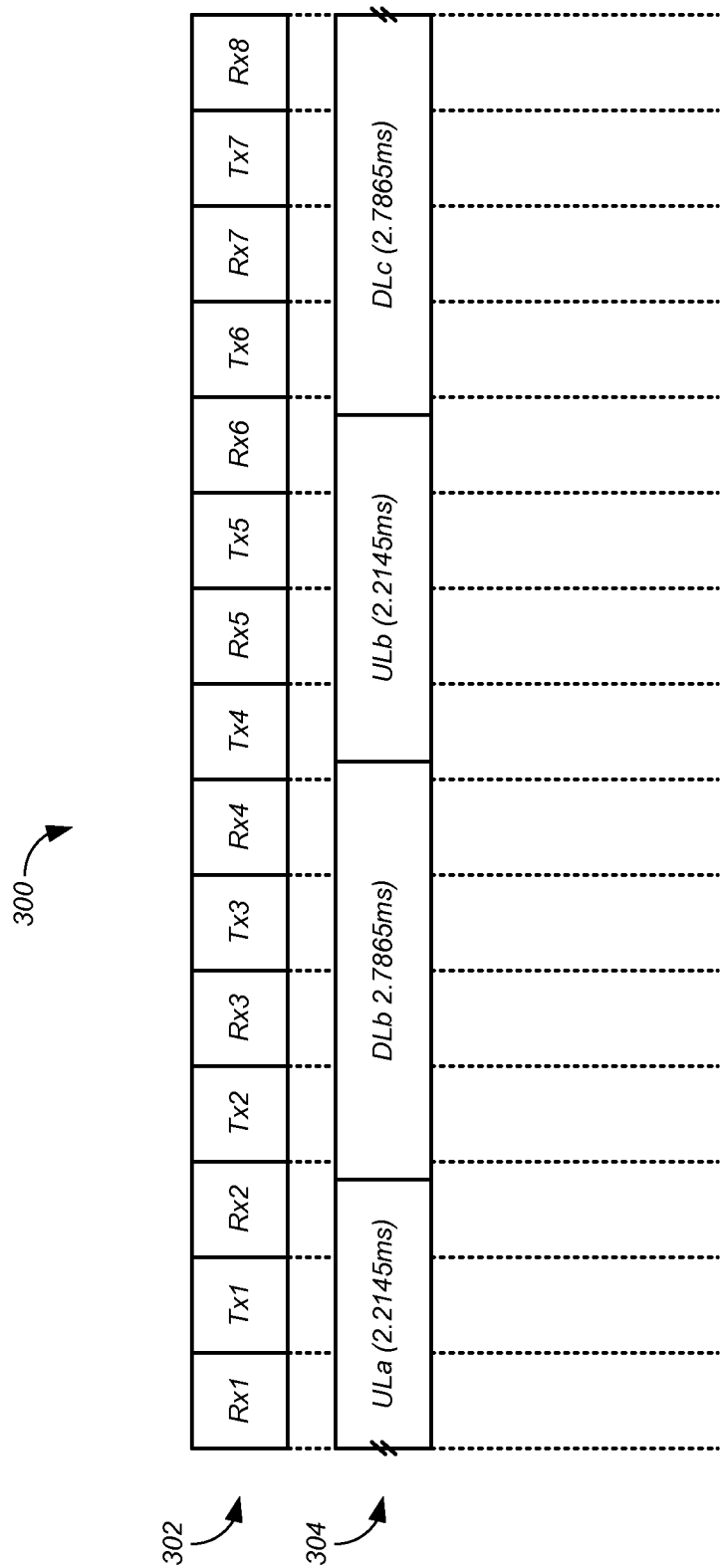
FIG. 3 shows a timeline for conventional Bluetooth and LTE schedules with no frame alignment.

In other cases, it is difficult for the Bluetooth scheduler 118 to find time for Bluetooth ACL transmission, for example when there is no frame alignment between the LTE schedule and the Bluetooth schedule. FIG. 3 shows a timeline 300 for conventional Bluetooth and LTE schedules with no frame alignment. Referring to FIG. 3, the Bluetooth schedule is shown at 302, and the LTE schedule is shown at 304. The time slot durations are the same as in FIG. 2. In FIG. 3, it is impossible to find any time for the Bluetooth ACL transmission, even for one-slot packets. For example, if the Bluetooth transceiver 114 sends a Bluetooth packet in time slot Tx1, the slave cannot reply in the next time slot Rx2 because an LTE uplink time slot ULa overlaps with time slot Rx2.

The described embodiments solve this problem by spoofing the packet type of the Bluetooth packets transmitted by the Bluetooth transceiver 114. In particular, the spoofed packet type makes the packet appear longer to the Bluetooth slave than the actual packet length. This spoofing is used to shift the reply packet to an LTE downlink time slot in order to minimize mutual interference.

Figure 4:
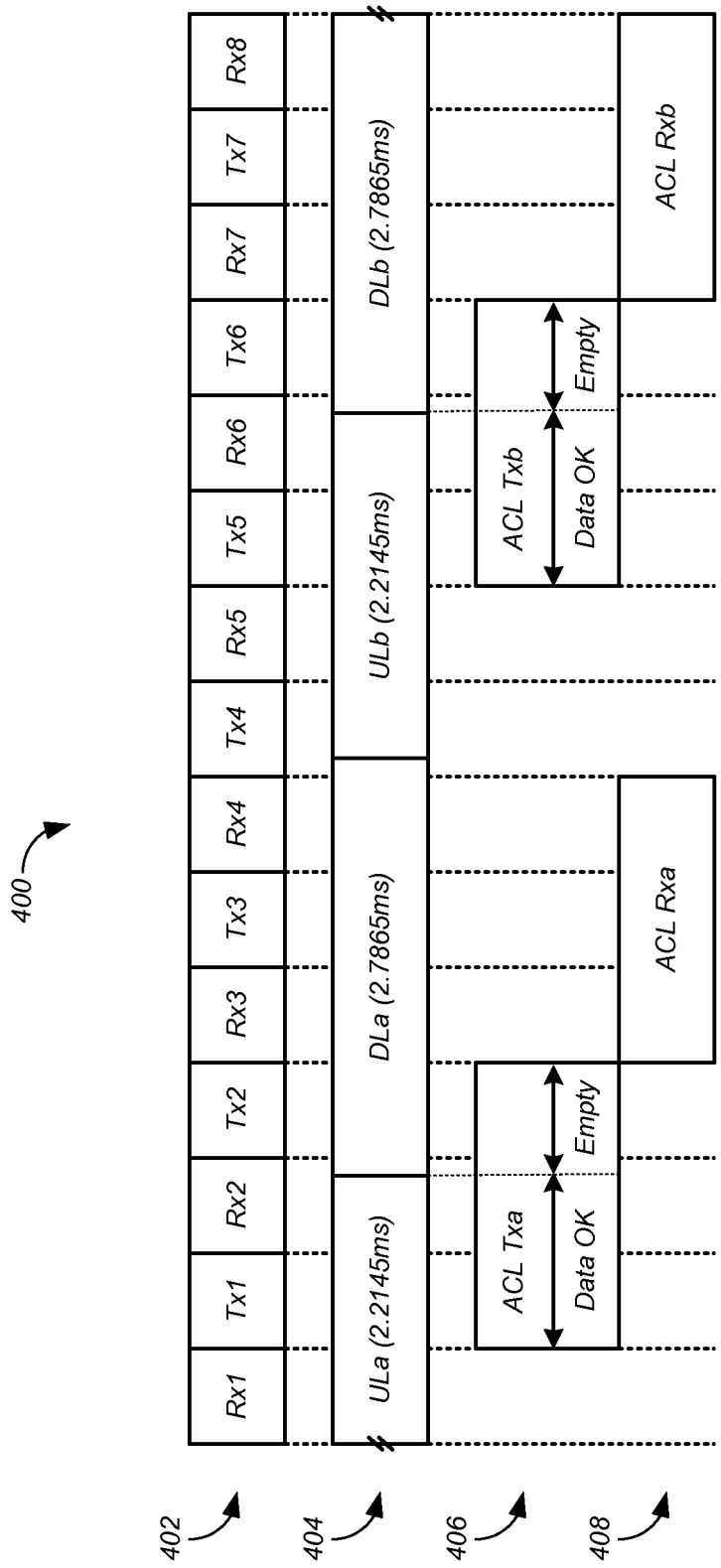
FIG. 4 shows a timeline for a coexistence solution with no frame alignment according to one embodiment.

FIG. 4 shows a timeline 400 for a coexistence solution with no frame alignment according to one embodiment. Referring to FIG. 4, a Bluetooth schedule is shown at 402, and an LTE schedule is shown at 404. The time slot durations are the same as in FIGS. 2 and 3. The Bluetooth ACL packets (ACL Txa/b) transmitted by the Bluetooth transceiver 114 to a Bluetooth slave device are shown at 406, and the Bluetooth ACL packets (ACL Rx) received by the Bluetooth transceiver 114 from a Bluetooth slave device are shown at 408. The Bluetooth radio 104 employs packet type spoofing in the transmitted packets ACL Txa and ACL Txb. Each packet ACL Txa and ACL Txb includes a "Data OK" portion and an "Empty" portion. Data can be transmitted in the "Data OK" portion because the "Data OK" portion is aligned with an LTE uplink time slot ULa. However, the "Empty" portion occurs during an LTE downlink time slot where Bluetooth transmission is not allowed. But because there is no data in the "Empty" portion, no Bluetooth signals are transmitted during that time. The "Empty" portion is shown only to indicate an interval spanned by the packet type spoofing. The time of the Bluetooth slave reply packets ACL Rxa and ACL Rxb is determined by the spoofed packet type. Therefore the Bluetooth slave does not reply until after the "Empty" portion of a corresponding master packet ACL Txa and ACL Txb. In this manner the spoofed packet type can be chosen so as to shift the reply packet to an LTE downlink time slot DL.

Figure 5:
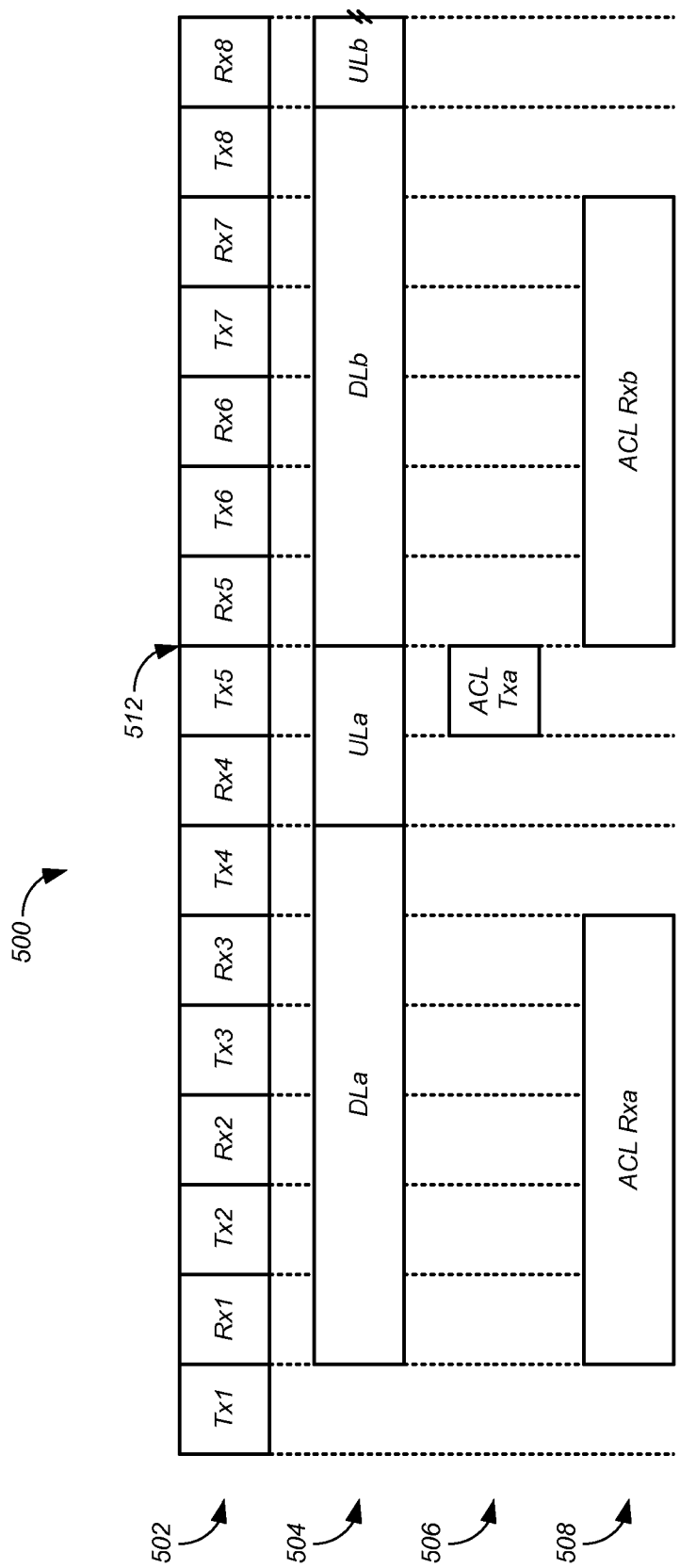
FIG. 5 shows a timeline for a conventional coexistence solution with frame alignment.

The described embodiments can also be used in the presence of frame alignment to improve throughput compared with conventional coexistence solutions. FIG. 5 shows a timeline 500 for a conventional coexistence solution with frame alignment. Referring to FIG. 5, the Bluetooth schedule is shown at 502, and the LTE schedule is shown at 504. A frame alignment between the Bluetooth schedule 502 and the LTE schedule 504 is shown at 512. A Bluetooth ACL packet (ACL Txa) transmitted by the Bluetooth transceiver 114 to a Bluetooth slave device is shown at 506, and the Bluetooth ACL packets (ACL Rx) received by the Bluetooth transceiver 114 from a Bluetooth slave device are shown at 508. In the example of FIG. 5, the Bluetooth radio 104 can send only a one-slot packet ACL Txa at frame alignment 512.

Figure 6:
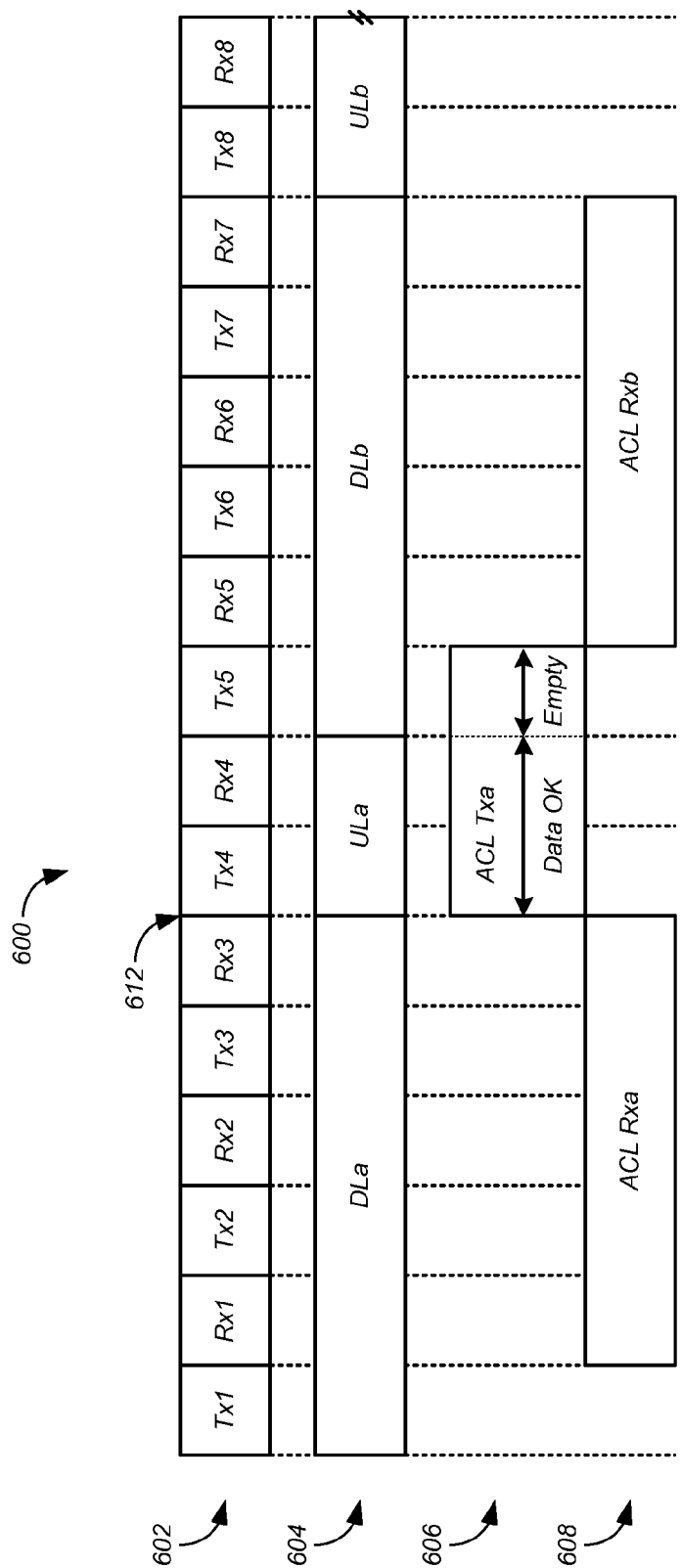
FIG. 6 shows a timeline for a coexistence solution with frame alignment according to one embodiment.

FIG. 6 shows a timeline 600 for a coexistence solution with frame alignment according to one embodiment. Referring to FIG. 6, the Bluetooth schedule is shown at 602, and the LTE schedule is shown at 604. A frame alignment between the Bluetooth schedule 602 and the LTE schedule 604 is shown at 612. The Bluetooth scheduler 118 determines times for transmitting the wireless Bluetooth signals representing the Bluetooth ACL packet based on frame alignment 612. A Bluetooth ACL packet (ACL Txa) transmitted by the Bluetooth transceiver 114 to a Bluetooth slave device is shown at 606, and the Bluetooth ACL packets (ACL Rx) received by the Bluetooth transceiver 114 from the Bluetooth slave device are shown at 608. In the example of FIG. 6, the Bluetooth radio 104 employs packet type spoofing to send two slots of data, resulting in a two-fold throughput improvement compared with the conventional coexistence solution of FIG. 5. In some embodiments, greater throughput multiples can be achieved.

Figure 7:
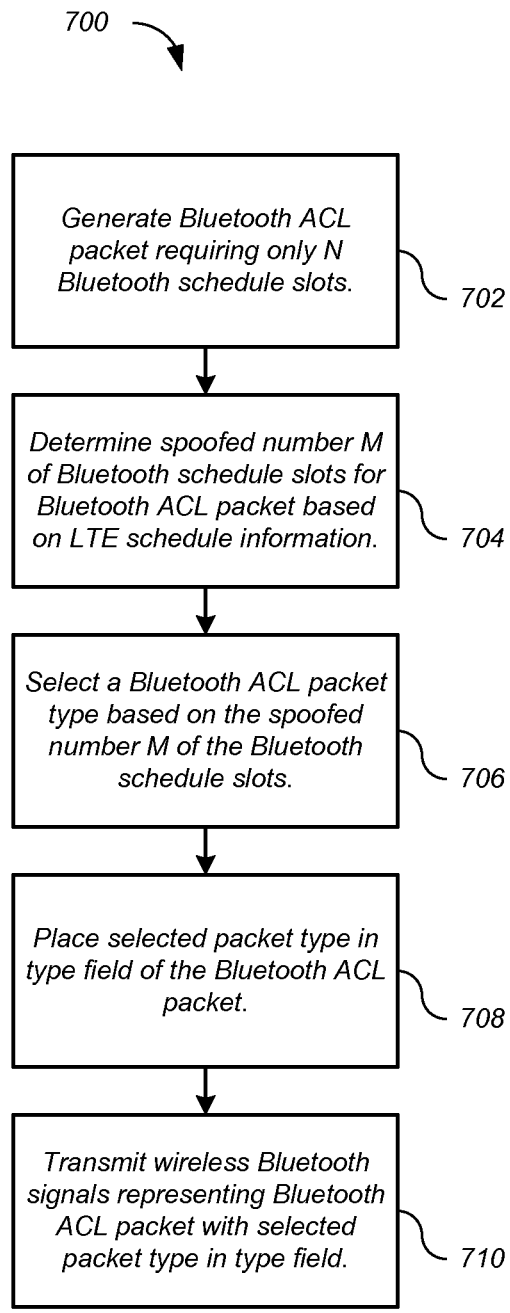
FIG. 7 shows a process for the user equipment of FIG. 1 according to one embodiment.

FIG. 7 shows a process 700 for the user equipment 100 of FIG. 1 according to one embodiment. Although in the described embodiments the elements of process 700 are presented in one arrangement, other embodiments may feature other arrangements. For example, in various embodiments, some or all of the elements of process 700 can be executed in a different order, concurrently, and the like. Also some elements of process 700 may not be performed, and may not be executed immediately after each other. In addition, some or all of the elements of process 700 can be performed automatically, that is, without human intervention.

Referring to FIG. 7, at 702, the Bluetooth packetizer 116 generates a Bluetooth ACL packet. The Bluetooth ACL packet generated by the Bluetooth packetizer 116 requires only N Bluetooth schedule slots, where N is a positive integer. In some embodiments, the Bluetooth scheduler 118 determines the number of slots N for the Bluetooth ACL packet based on the LTE schedule information 126 provided by the LTE radio 102. In some embodiments, the LTE schedule information 126 represents the duration of the uplink time slots UL, the duration of the downlink time slots DL, and a frame synchronization indicator that indicates the timing of the occurrence of time slots UL, DL.

At 704, the Bluetooth scheduler 118 determines a spoofed number M of Bluetooth schedule slots for the Bluetooth ACL packet based on the LTE schedule information 126, where M is a positive integer, and where M>N. In particular, the Bluetooth scheduler 118 selects a value of M that will shift the reply packet to an LTE downlink slot. The determination of the spoofed number M of Bluetooth schedule slots can include consideration of the required number of slots N.

At 706, the Bluetooth packetizer 116 selects a Bluetooth ACL packet type based on the spoofed number M of the Bluetooth schedule slots. There are seven types of Bluetooth ACL packets: DM1, DH1, DM3, DH3, DM5, DH5, and AUX1. Each type indicates a number of Bluetooth schedule slots for the packet. The DM1, DH1, and AUX1 packet types indicate one Bluetooth schedule slot. The DM3 and DH3 packet types indicate three Bluetooth schedule slots. The DM5 and DH5 packet types indicate five Bluetooth schedule slots. When M=1, the Bluetooth packetizer 116 selects the DM1, DH1, or AUX1 packet type. When M=3, the Bluetooth packetizer 116 selects the DM3 or DH3 packet type. When M=5, the Bluetooth packetizer 116 selects the DM5 or DH5 packet type.

At 708, the Bluetooth packetizer 116 indicates the selected packet type in the type field of the Bluetooth ACL packet. At 710, the Bluetooth transceiver 114 transmits wireless Bluetooth signals 122 representing the Bluetooth ACL packet with the selected packet type in the type field. In some embodiments, the Bluetooth scheduler 118 determines the time for transmitting the wireless Bluetooth signals 122 based on a frame alignment between the time slots of the LTE schedule 108 and the time slots of the Bluetooth schedule 120, for example as discussed with reference to FIGS. 5 and 6.

Figure 8:
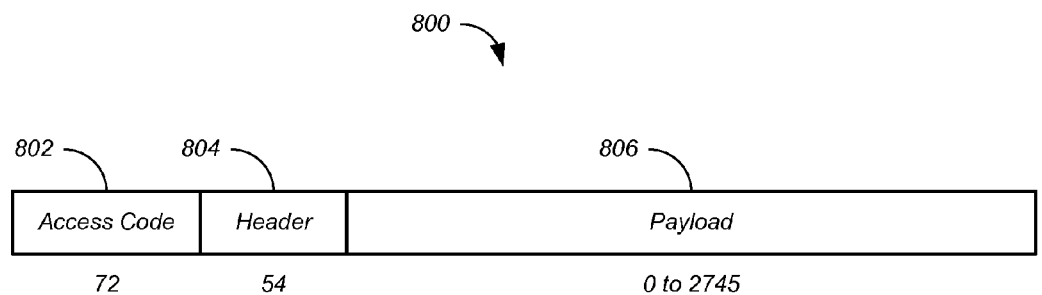
FIG. 8 shows the packet format of a Bluetooth Asynchronous Connection-oriented [logical transport] (ACL) packet.

FIG. 8 shows the packet format of a Bluetooth ACL packet 800. Referring to FIG. 8, the Bluetooth ACL packet 800 includes a 72-bit access code field 802, a 54-bit header field 804, and a payload field 806 with a length of 0 to 2745 bits.

Figure 9:
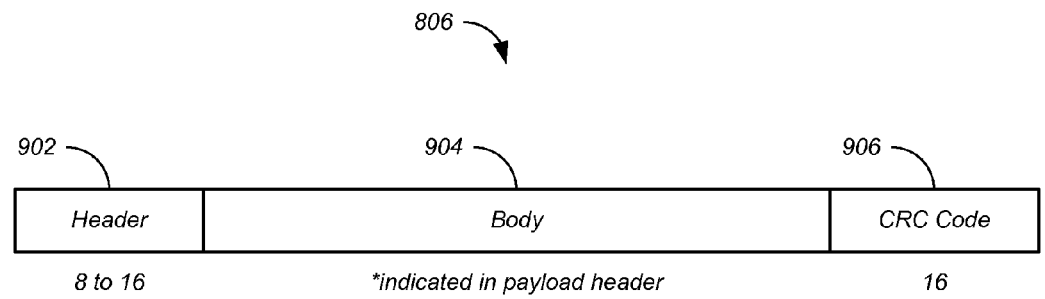
FIG. 9 shows the format of the payload field of FIG. 8.

FIG. 9 shows the format of the payload field 806 of FIG. 8. Referring to FIG. 9, the payload field 806 includes a payload header field 902 with a length of 8 to 16 bits, a body field 904 with a length indicated in the payload header field 902, and a 16-bit cyclic redundancy check (CRC) code field 906.

Figure 10:
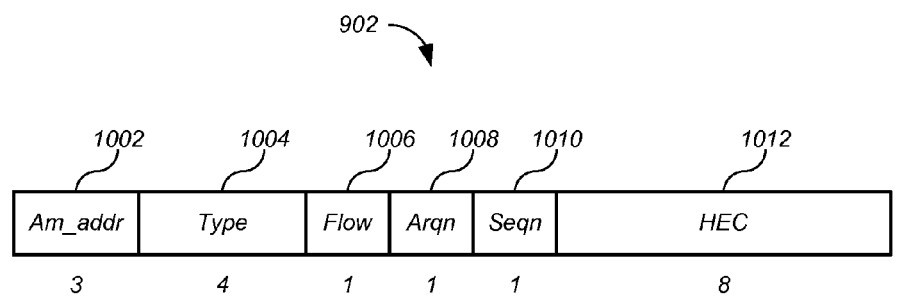
FIG. 10 shows the format of the payload header field of FIG. 9 for a Bluetooth ACL packet.

FIG. 10 shows the format of the payload header field 902 of FIG. 9 for a Bluetooth ACL packet. Referring to FIG. 10, the payload header field 902 includes a 3-bit temporary address (Am_addr) field 1002, a 4-bit Type field 1004, a 1-bit Flow field 1006, a 1-bit Arqn field 1008, a 1-bit sequence number (Seqn) field 1010, and an 8-bit header error check (HEC) field 1012. In some embodiments, the Bluetooth packetizer 116 places the packet type, selected based on the spoofed number M of Bluetooth schedule slots, in the Type field 1004.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:
1. A wireless device comprising:
a first transceiver configured to communicate according to a first schedule using a first communication protocol, wherein the first schedule includes information of uplink slots and downlink slots for communicating using the first communication protocol;

a second transceiver configured to communicate according to a second schedule using a second communication protocol, wherein the second schedule includes a first number of slots for transmitting packets using the second communication protocol, wherein the second schedule is based on the first schedule, and wherein the second communication protocol is different from the first communication protocol;

a scheduler configured to change, based on the first schedule, the first number of slots for transmitting packets using the second communication protocol to a second number of slots, wherein the second number of slots is greater than the first number of slots; and a packetizer configured to select a packet type of a first packet for transmission from the first transceiver to a remote device, wherein the packet type indicates to the remote device that the first packet requires the second number of slots for transmission, and wherein the packet type indicates to the remote device that the remote device is to shift transmission of a response to the first packet to one of the downlink slots of the first schedule to minimize interference between communications of the first transceiver and the second transceiver.

2. The wireless device of claim 1, wherein:
the first transceiver includes a Long Term Evolution (LTE) transceiver;
the first schedule includes an LTE schedule;
the second transceiver includes a Bluetooth transceiver;
the second schedule includes a Bluetooth schedule; and
the first packet includes a Bluetooth Asynchronous Connection-oriented (ACL) logical transport packet.

3. The wireless device of claim 1, wherein the packetizer is configured to (i) select the packet type based on the second number of slots, and (ii) indicate the packet type in a type field of the first packet prior to the second transceiver transmitting the first packet.

4. The wireless device of claim 1, wherein the scheduler is configured to align times for transmitting packets from the second transceiver with the uplink slots of the first schedule.

5. The wireless device of claim 1, wherein the scheduler is configured to determine times for transmitting packets from the second transceiver based on an alignment between the first schedule and the second schedule.

6. A method for a wireless device, the method comprising:
communicating according to a first schedule using a first communication protocol, wherein the first schedule includes information of uplink slots and downlink slots for communicating using the first communication protocol;
communicating according to a second schedule using a second communication protocol, wherein the second schedule includes a first number of slots for transmitting packets using the second communication protocol, wherein the second schedule is based on the first schedule, and wherein the second communication protocol is different from the first communication protocol;
changing, based on the first schedule, the first number of slots for transmitting packets using the second communication protocol to a second number of slots, wherein the second number of slots is greater than the first number of slots; and
selecting a packet type of a first packet for transmission from the wireless device to a remote device using the second communication protocol;
indicating, via the packet type, to the remote device that the first packet requires the second number of slots for transmission; and
shifting transmission of a response to the first packet from the remote device to one of the downlink slots of the first schedule to minimize interference between communications of the wireless device using the first communication protocol and the second communication protocol.

7. The method of claim 6, wherein:
the first communication protocol includes a Long Term Evolution (LTE) communication protocol;
the first schedule includes an LTE schedule;
the second communication protocol includes a Bluetooth communication protocol;
the second schedule includes a Bluetooth schedule; and
the first packet includes a Bluetooth Asynchronous Connection-oriented (ACL) logical transport packet.

8. The method of claim 6, further comprising:
selecting the packet type based on the second number of slots; and
indicating the packet type in a type field of the first packet prior to the wireless device transmitting the first packet using the second communication protocol.

9. The method of claim 6, further comprising aligning times for transmitting packets from the wireless device using the second communication protocol with the uplink slots of the first schedule.

10. The method of claim 6, further comprising determining times for transmitting packets from the wireless device using the second communication protocol based on an alignment between the first schedule and the second schedule.

11. A computer program stored on a tangible, non-transient computer-readable medium, the computer program comprising instructions for:
communicating according to a first schedule using a first communication protocol, wherein the first schedule includes information of uplink slots and downlink slots for communicating using the first communication protocol;
communicating according to a second schedule using a second communication protocol, wherein the second schedule includes a first number of slots for transmitting packets using the second communication protocol, wherein the second schedule is based on the first schedule, and wherein the second communication protocol is different from the first communication protocol;
changing, based on the first schedule, the first number of slots for transmitting packets using the second communication protocol to a second number of slots, wherein the second number of slots is greater than the first number of slots; and
selecting a packet type of a first packet for transmission from a wireless device to a remote device using the second communication protocol;
indicating, via the packet type, to the remote device that the first packet requires the second number of slots for transmission; and
shifting transmission of a response to the first packet from the remote device to one of the downlink slots of the first schedule to minimize interference between communications of the wireless device using the first communication protocol and the second communication protocol.

12. The computer program of claim 11, wherein:
the first communication protocol includes a Long Term Evolution (LTE) communication protocol;

the first schedule includes an LTE schedule;
the second communication protocol includes a Bluetooth communication protocol;
the second schedule includes a Bluetooth schedule; and
the first packet includes a Bluetooth Asynchronous Connection-oriented (ACL) logical transport packet.

13. The computer program of claim 11, further comprising:
selecting the packet type based on the second number of slots; and
indicating the packet type in a type field of the first packet prior to the wireless device transmitting the first packet using the second communication protocol.

14. The computer program of claim 11, further comprising aligning times for transmitting packets from the wireless device using the second communication protocol with the uplink slots of the first schedule.

15. The computer program of claim 11, further comprising determining times for transmitting packets from the wireless device using the second communication protocol based on an alignment between the first schedule and the second schedule.

* * * * *